W. L. DIXON.
AIR OPERATED ADAPTER FOR CLAMPING WORK WHILE TURNING.
APPLICATION FILED NOV. 10, 1920.

1,412,170.

Patented Apr. 11, 1922.

INVENTOR
Walter L. Dixon
BY
Redding & Greeley
his ATTORNEYS

UNITED STATES PATENT OFFICE.

WALTER L. DIXON, OF NEW BRUNSWICK, NEW JERSEY, ASSIGNOR TO INTERNATIONAL MOTOR COMPANY, OF NEW YORK, N. Y., A CORPORATION OF DELAWARE.

AIR-OPERATED ADAPTER FOR CLAMPING WORK WHILE TURNING.

1,412,170.          Specification of Letters Patent.    Patented Apr. 11, 1922.

Application filed November 10, 1920. Serial No. 423,139.

*To all whom it may concern:*

Be it known that I, WALTER L. DIXON, a citizen of the United States, residing in the city of New Brunswick, in the State of New Jersey, have invented certain new and useful Improvements in Air-Operated Adapters for Clamping Work While Turning, of which the following is a specification, reference being had to the accompanying drawing, forming a part hereof.

This invention relates to an air operated adapter associated with a turning machine for clamping flanged work on an arbor for machining operations. The adapter illustrated in the embodiment is shown for clamping hub caps in place, but it will be understood as the description proceeds that the invention is broader than the embodiment illustrated and rests on a principle which can be incorporated in adapters for clamping work of other character. The principal object of the invention is to provide an air operated adapter which will operate quickly to clamp work on an arbor and will operate quickly and positively to release the work when the operations are completed. Mechanically, the embodiment of the principle involves the translation of reciprocating motion into rotary motion by means of slot and stud connections between rotatable clamping members and a relatively nonrotatable head, the clamping members being reciprocated longitudinally by means of an air plunger. A second object of the invention is to associate with such a head an annular arbor of hardened metal formed to receive work of predetermined size and shape and removable for replacement by arbors adapted to support work of other sizes and shapes. Reference is now to be had to the accompanying drawing for a detailed description of one embodiment of the invention, in which—

The rotary head $a$ has secured thereto a face plate $b$, as by means of bolts $b'$, and is chambered, as at $a'$, to receive a reciprocating disc $c$ carried on an air operated plunger $d$. The disc $c$ supports rotatably therein one or more oscillating clamps $e$, $e'$, $e^2$, extending through the face plate $b$ and having hooked ends E for a purpose which will appear. Each of the clamps $e$, $e'$, $e^2$, has formed in its periphery an elongated spiral slot $e^3$ which terminates in a longitudinal slot $e^4$ in which rests the end of a stud $f$ mounted radially of the face plate and extending in from its periphery. The shank $e^5$ of each clamping piece is rotatable in the disc $c$.

In the preferred form of the invention the face plate $b$ is channeled to receive an arbor ring $g$ of a size and shape to support the work $h$ illustrated as a hub cap. The arbor ring $g$ is supported in the face plate $b$ by means of bolts $i$.

Figure 1:
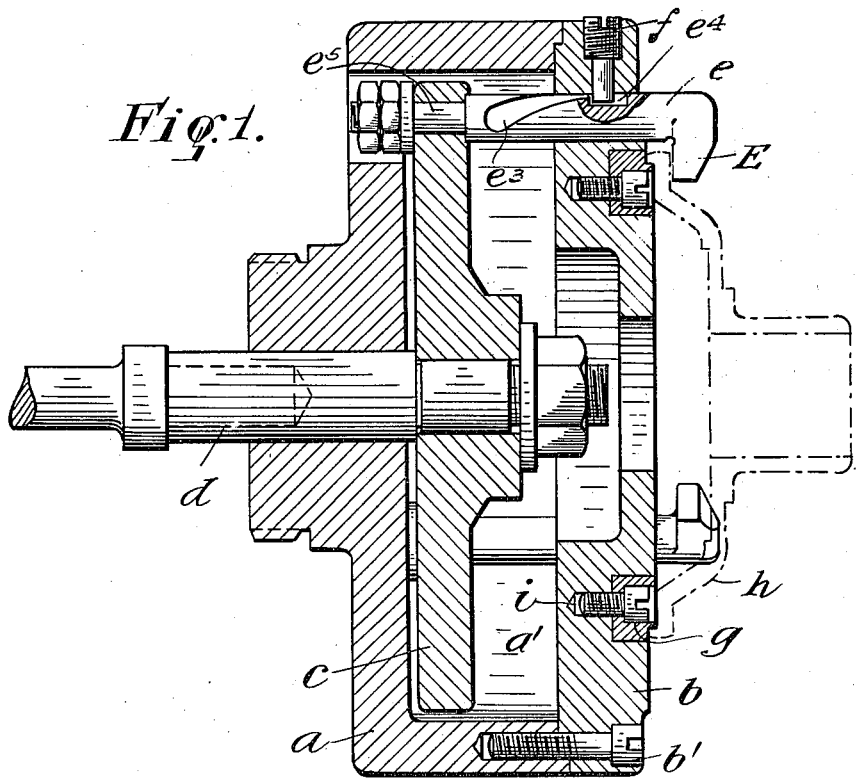
Figure 1 is a view in longitudinal section of an arbor having associated therewith an air operated adapter embodying the improvements.
Figure 2:
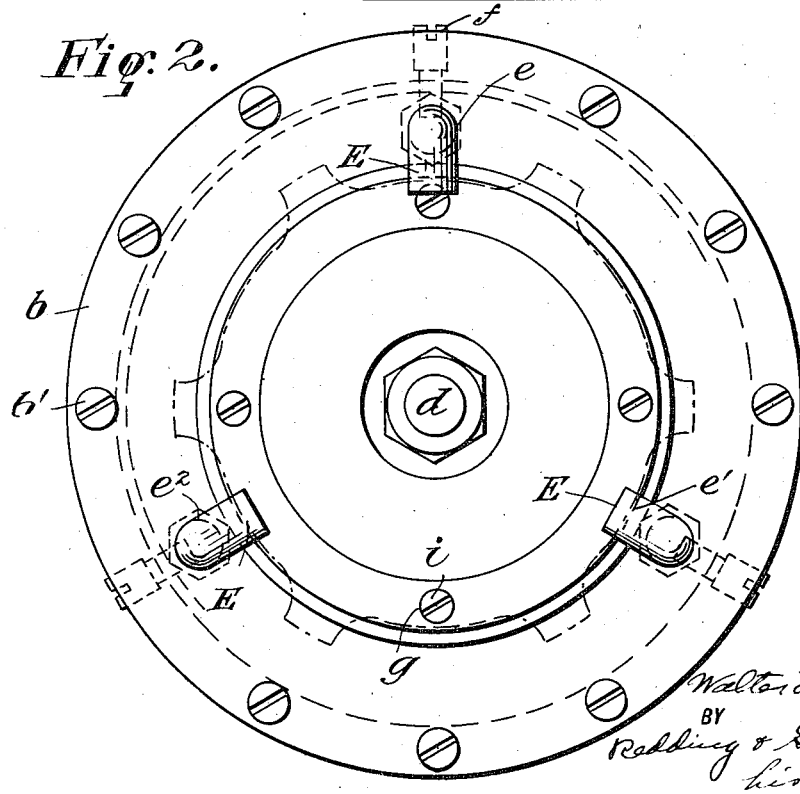
Figure 2 is a view in end elevation of the adapter shown in Figure 1.

In the figures the hub cap $h$ is shown as clamped on to the arbor ring $g$ by means of three clamping hooks $e$, $e'$, $e^2$, the hooked ends E of which overlie the flanged hub in the manner indicated in Figure 1. At this time it is evident that the air plunger $d$ has been retracted with the disc $c$ to the left end of the chamber $a'$, as viewed in Figure 1, thereby retracting each of the clamping pieces and impressing the hooks E firmly on to the flange of the hub. At this time each of the studs $f$ rests in the longitudinal groove $e^4$ in the periphery of the respective hooks, the corresponding one of which is $e$. When the air plunger $d$ is moved towards the right, as viewed in Figure 1, the disc $c$ with the clamping pieces $e$, $e'$, $e^2$ will be moved towards the right and each of these clamping pieces will be rotated about their respective axes by engagement of corresponding parts, such as the spiral groove $e^3$ with the stud $f$. Rotation of the clamping pieces will move the hooked ends E away from the flange of the hub $h$, thereby permitting the work to be removed from the arbor. When the next piece of work is applied to the arbor and the air plunger $d$ moved to the left, the respective clamps $e$, $e'$, $e^2$ will be rotated contrariwise by the respective slot and stud connections and the hooked ends E will be moved over the work as shown in Figure 1.

If a piece of work of different diameter were to be mounted on the same arbor and clamped by the same adapter it is evident that the arbor ring $g$ might be replaced with an arbor ring whose shoulder would conform to the diameter of the work to be supported. This removable arbor ring is a feature of importance in making the adapter suitable for different pieces of work.

I claim as my invention:

1. An air operated adapter for clamping work while turning, comprising a rotary supporting head for the work, an air operated plunger movable axially therein, a clamping piece rotatably supported on the air operated plunger and movable axially therewith and a slot and stud connection between the clamping piece and the head to effect rotative movement of the clamping piece upon reciprocation of the plunger.

2. An air operated adapter for clamping work while turning, comprising a rotary work supporting head formed with a chamber, an air operated plunger extended into the chamber and carrying a plate adapted to reciprocate in the chamber, a plurality of clamping pieces supported rotatably on the plate and extending through the head and adapted to reciprocate with the plate and a slot and stud connection between each of said clamping pieces and the head to cause rotation of the clamping pieces upon reciprocation of the plate.

This specification signed this 5th day of November, A. D. 1920.

WALTER L. DIXON.